US012043515B2

(12) United States Patent
Marpu et al.

(10) Patent No.: US 12,043,515 B2
(45) Date of Patent: Jul. 23, 2024

(54) ELEVATOR SYSTEM MANAGEMENT UTILIZING MACHINE LEARNING

(71) Applicant: OTIS ELEVATOR COMPANY, Farmington, CT (US)

(72) Inventors: Appalaraju Marpu, Telangana (IN); Anup Sinha, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1385 days.

(21) Appl. No.: 16/535,353

(22) Filed: Aug. 8, 2019

(65) Prior Publication Data

US 2020/0055692 A1   Feb. 20, 2020

(30) Foreign Application Priority Data

Aug. 16, 2018 (IN) .............................. 201811030748

(51) Int. Cl.
*B66B 1/24* (2006.01)
*G06N 20/00* (2019.01)
(52) U.S. Cl.
CPC ........... *B66B 1/2408* (2013.01); *G06N 20/00* (2019.01); *B66B 2201/222* (2013.01)
(58) Field of Classification Search
CPC ..... B66B 1/2408; B66B 1/468; B66B 5/0012; B66B 1/3476; B66B 2201/222; B66B 1/2458; B66B 2201/402; B66B 2201/403; B66B 2201/223; B66B 5/0006; B66B 2201/4607; B66B 1/3492
See application file for complete search history.

(56) References Cited

U.S. PATENT DOCUMENTS

| 5,306,878 | A | 4/1994 | Kubo |
| 5,331,121 | A * | 7/1994 | Tsuji ..................... B66B 1/2408 |
| | | | 187/388 |
| 5,354,957 | A | 10/1994 | Robertson |
| 6,257,373 | B1 | 7/2001 | Hikita et al. |
| 6,615,175 | B1 | 9/2003 | Gazdzinski et al. |

(Continued)

FOREIGN PATENT DOCUMENTS

| CN | 1055341 A | 10/1991 |
| CN | 105600627 | 5/2016 |

(Continued)

OTHER PUBLICATIONS

Chinese Office Action: dated Jun. 30, 2021; Application No. 201910753937.9; Filed: Aug. 15, 2019; 9 pages.

*Primary Examiner* — Marlon T Fletcher
(74) *Attorney, Agent, or Firm* — CANTOR COLBURN LLP

(57) ABSTRACT

Systems and methods for operating an elevator system are provided. Aspects includes receiving, by a processor, a call request for an elevator car in an elevator system. Receiving sensor data from a plurality of sensors associated with the elevator car, wherein the plurality of sensors are configured to collect sensor data from one or more predefined areas associated with the elevator car. Determining an occupancy level in the elevator car based on a feature vector, generated by a machine learning model, comprising a plurality of features extracted from the sensor data and operating, by the processor, the elevator car based at least in part on the occupancy level.

10 Claims, 4 Drawing Sheets

(56) References Cited

U.S. PATENT DOCUMENTS

| | | | |
|---|---|---|---|
| 7,377,364 B2 | 5/2008 | Tyni et al. | |
| 7,529,646 B2 | 5/2009 | Lin et al. | |
| 9,443,192 B1 | 9/2016 | Cosic | |
| 9,617,115 B2 | 4/2017 | Sarjanen et al. | |
| 11,021,344 B2 * | 6/2021 | Finn | B66B 1/3476 |
| 2015/0166301 A1 | 6/2015 | Sorsa et al. | |
| 2016/0289042 A1 | 10/2016 | Fang et al. | |
| 2016/0289043 A1 | 10/2016 | Fang et al. | |
| 2016/0289044 A1 | 10/2016 | Hsu et al. | |
| 2016/0292522 A1 | 10/2016 | Chen et al. | |
| 2016/0297642 A1 * | 10/2016 | Finn | B66B 1/3476 |
| 2016/0364927 A1 | 12/2016 | Barry et al. | |
| 2017/0369275 A1 | 12/2017 | Saraswat et al. | |
| 2018/0093853 A1 | 4/2018 | Kuusinen et al. | |
| 2018/0129974 A1 * | 5/2018 | Giering | G05B 13/027 |
| 2019/0284019 A1 * | 9/2019 | Gireddy | B66B 5/0012 |
| 2019/0346588 A1 * | 11/2019 | Hsu | B66B 1/2408 |
| 2019/0382233 A1 * | 12/2019 | Pusala | B66B 1/2458 |
| 2020/0055692 A1 * | 2/2020 | Marpu | B66B 1/3476 |

FOREIGN PATENT DOCUMENTS

| | | | | |
|---|---|---|---|---|
| CN | 105668360 A | | 6/2016 | |
| CN | 107368076 B | | 7/2017 | |
| CN | 107500064 A | | 12/2017 | |
| CN | 108290704 A | | 7/2018 | |
| CN | 108290704 A | * | 7/2018 | ........... B66B 1/2408 |
| CN | 107055231 A | | 8/2018 | |
| CN | 109279466 A | * | 1/2019 | ............... B66B 1/34 |
| CN | 110835028 A | | 2/2020 | |
| EP | 3075691 A2 | * | 10/2016 | ........... B66B 1/2408 |
| EP | 3075692 A1 | * | 10/2016 | ........... B66B 1/2408 |
| EP | 3075694 A1 | * | 10/2016 | ........... B66B 1/2408 |
| EP | 3075695 A1 | * | 10/2016 | ........... B66B 1/2408 |
| EP | 3075696 A1 | * | 10/2016 | ........... B66B 1/3461 |
| EP | 3075697 A1 | * | 10/2016 | ........... B66B 1/3461 |
| EP | 3075699 A1 | * | 10/2016 | ........... B66B 1/3461 |
| EP | 3187447 A1 | | 7/2017 | |
| EP | 3299327 A1 | * | 3/2018 | ........... B66B 1/3461 |
| EP | 3613690 A1 | * | 2/2020 | ............... B66B 1/28 |
| JP | 03133885 U | | 6/1991 | |
| JP | 07183803 A | | 12/1993 | |
| KR | 20160049209 A | | 5/2016 | |
| KR | 20210063121 A | * | 6/2021 | |
| WO | 2017085352 | | 5/2017 | |
| WO | 2017088904 A1 | | 6/2017 | |
| WO | 2018050471 A1 | | 3/2018 | |
| WO | WO-2018109257 A1 | * | 6/2018 | |

* cited by examiner

ELEVATOR SYSTEM MANAGEMENT UTILIZING MACHINE LEARNING

CROSS-REFERENCE TO RELATED APPLICATIONS

This application claims the benefit of Indian provisional application no. 201811030748 filed Aug. 16, 2018, which is incorporated herein by reference in its entirety.

BACKGROUND

The subject matter disclosed herein generally relates to elevator systems and, more particularly, to elevator system management utilizing machine learning.

Elevator cars in an elevator system typically respond to an elevator call when a potential elevator passenger presses the physical call button in an elevator lobby. Utilizing control logic, an elevator car in the elevator system is routed to the potential passenger. The potential passenger has the option of either boarding the elevator car sent to the potential passenger or waiting for a different elevator car. Some factors that influence the potential passenger decision to board the elevator car or wait for another elevator car include the occupancy level of the elevator cars. Some individuals prefer to ride an elevator car with fewer people presence while some do not mind a full elevator car. Also, a potential passenger may have additional colleagues or friends with him or her that would influence whether the party will board or wait for the next elevator car.

BRIEF DESCRIPTION

According to one embodiment, an elevator system is provided. The elevator system includes an elevator car, a plurality of sensors associated with the elevator car, wherein the plurality of sensors are configured to collect sensor data from one or more predefined areas associated with the elevator car, a controller coupled to a memory, the controller configured to receive a call request for the elevator car. Receive sensor data from the plurality of sensors. Determine an occupancy level in the elevator car based on a feature vector, generated by a machine learning model, comprising a plurality of features extracted from the sensor data and operate the elevator car based at least in part on the occupancy level.

In addition to one or more of the features described above, or as an alternative, further embodiments of the elevator system may include that the call request is received from a hall call device receiving a user input.

In addition to one or more of the features described above, or as an alternative, further embodiments of the elevator system may include that the call request is received from a user device.

In addition to one or more of the features described above, or as an alternative, further embodiments of the elevator system may include that operating the elevator car based at least in part on the occupancy level comprises comparing the occupancy level to an occupancy threshold and based on a determination that the occupancy level is above the occupancy threshold, declining the call request for the elevator car.

In addition to one or more of the features described above, or as an alternative, further embodiments of the elevator system may include that operating the elevator car based at least in part on the occupancy level comprises comparing the occupancy level to an occupancy threshold and based on a determination that the occupancy level is below the occupancy threshold, servicing the call request for the elevator car.

In addition to one or more of the features described above, or as an alternative, further embodiments of the elevator system may include that In addition to one or more of the features described above, or as an alternative, further embodiments of the elevator system may include that at least one of the one or more predefined floor areas comprises an area adjacent to an entryway for the elevator car.

In addition to one or more of the features described above, or as an alternative, further embodiments of the elevator system may include that the controller is further configured to analyze, utilizing the machine learning model, the sensor data to determine a lobby occupancy level of an elevator lobby associated with the call request.

In addition to one or more of the features described above, or as an alternative, further embodiments of the elevator system may include that the controller is further configured to generate an occupancy threshold based at least in part on the lobby occupancy level and based on a determination that the occupancy level is above the occupancy threshold, declining the call request for the elevator car.

In addition to one or more of the features described above, or as an alternative, further embodiments of the elevator system may include that the plurality of sensors comprises at least one of a weight sensor and a camera.

According to one embodiment, a method is provided. The method includes receiving, by a processor, a call request for an elevator car in an elevator system. Receiving sensor data from a plurality of sensors associated with the elevator car, wherein the plurality of sensors are configured to collect sensor data from one or more predefined areas associated with the elevator car. Determining an occupancy level in the elevator car based on a feature vector, generated by a machine learning model, comprising a plurality of features extracted from the sensor data and operating, by the processor, the elevator car based at least in part on the occupancy level.

In addition to one or more of the features described above, or as an alternative, further embodiments of the method may include that the call request is received from a hall call device receiving a user input.

In addition to one or more of the features described above, or as an alternative, further embodiments of the method may include that the call request is received from a user device.

In addition to one or more of the features described above, or as an alternative, further embodiments of the method may include that operating the elevator car based at least in part on the occupancy level comprises comparing the occupancy level to an occupancy threshold and based on a determination that the occupancy level is above the occupancy threshold, declining the call request for the elevator car.

In addition to one or more of the features described above, or as an alternative, further embodiments of the method may include that operating the elevator car based at least in part on the occupancy level comprises comparing the occupancy level to an occupancy threshold and based on a determination that the occupancy level is below the occupancy threshold, servicing the call request for the elevator car.

In addition to one or more of the features described above, or as an alternative, further embodiments of the method may include that at least one of the one or more predefined floor areas comprises an area adjacent to an entryway for the elevator car.

In addition to one or more of the features described above, or as an alternative, further embodiments of the method may include analyzing, utilizing the machine learning model, the sensor data to determine a lobby occupancy level of an elevator lobby associated with the call request.

In addition to one or more of the features described above, or as an alternative, further embodiments of the method may include generating an occupancy threshold based at least in part on the lobby occupancy level and based on a determination that the occupancy level is above the occupancy threshold, declining the call request for the elevator car.

In addition to one or more of the features described above, or as an alternative, further embodiments of the method may include based on a determination that the occupancy level is below the occupancy threshold, servicing the call request for the elevator car.

In addition to one or more of the features described above, or as an alternative, further embodiments of the method may include that the plurality of sensors comprises at least one of a weight sensor and a camera.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
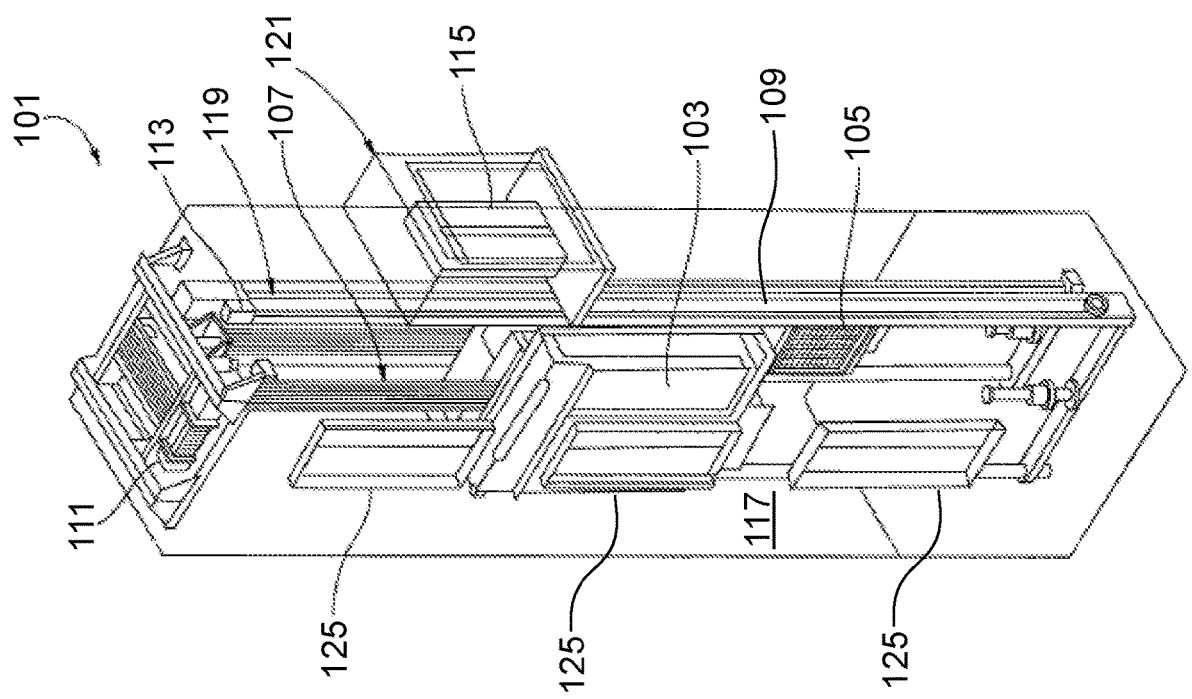
FIG. 1 is a schematic illustration of an elevator system that may employ various embodiments of the disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, such as hydraulic and/or ropeless elevators, may employ embodiments of the present disclosure. FIG. 1 is merely a non-limiting example presented for illustrative and explanatory purposes.

Figure 2:
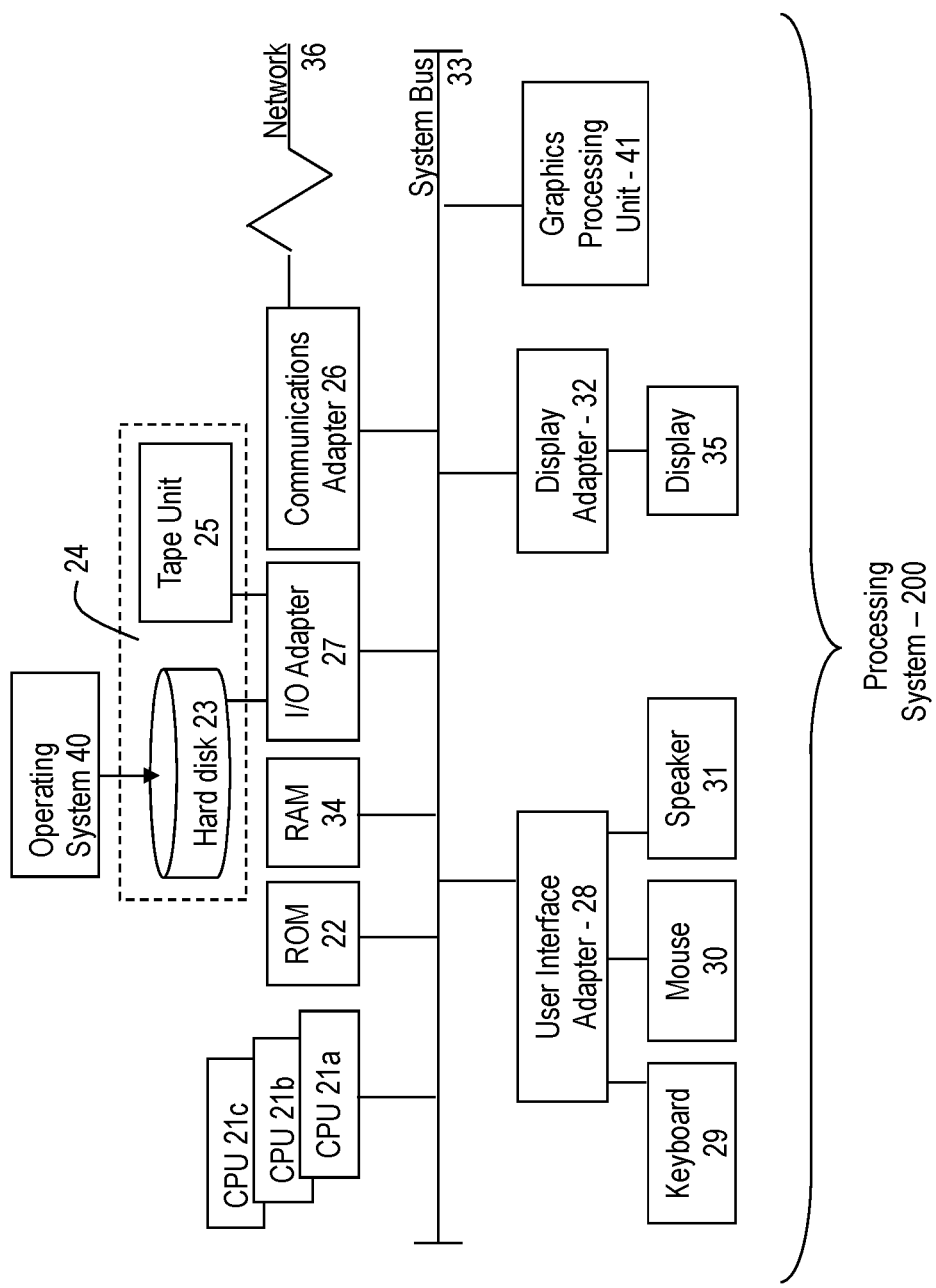
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 22 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

Turning now to an overview of technologies that are more specifically relevant to aspects of the disclosure, elevator systems typically run the risk of deploying an elevator car to a specific floor of a building when the elevator car is full with passengers already. Typically, an elevator car will service hall call requests based on elevator controller logic that determines which floors an elevator car will service. Unfortunately, elevator occupancy can cause potential passengers waiting in an elevator lobby to wait longer because the passenger or the passenger group will not fit within the elevator car due to excessive occupancy. When this occurs, the potential passengers will need to wait for the full elevator car door to close and move on before submitted another hall call request for an elevator car. Deploying, stopping, re-deploying elevator cars in an elevator system can cause increases in power consumption and wear and tear due to additional hall calls. In addition to the increase in power consumption by the elevator system, these additional hall calls can lead to increase travel time and passenger wait times for all passengers in a building.

Turning now to an overview of the aspects of the disclosure, one or more embodiments address the above-described shortcomings of the prior art by providing a system for identifying fully occupied elevator cars utilized machine learning techniques, as described in more detail below. Once an elevator car is identified has being fully occupied, any hall calls for the elevator car can be discarded. Also, any elevator car being less than fully occupied can service hall calls.

Figure 3:
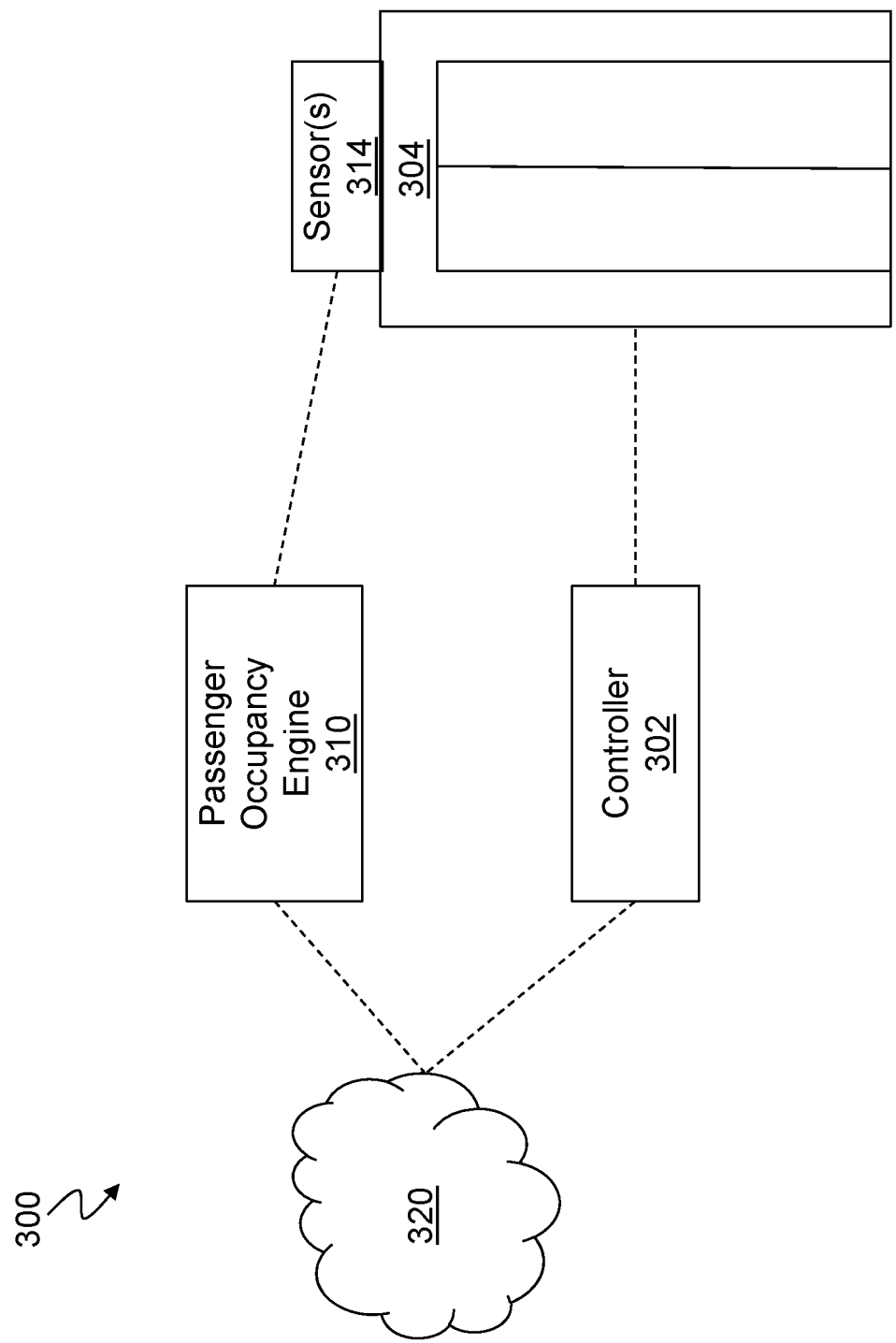
FIG. 3 depicts a block diagram of a system for managing an elevator system according to one or more embodiments of the disclosure.

Turning now to a more detailed description of aspects of the present disclosure, FIG. 3 depicts a system 300 for managing elevator call requests according to one or more embodiments. The system 300 includes an elevator controller 302, an elevator car 304, a passenger occupancy engine 310, and a network 320. The passenger occupancy engine 310 can be in electronic communication with one or more sensors 314 that are affixed or near the elevator car 304. The passenger occupancy engine 310 is in electronic communication with the controller 302 either directly or, as shown in the illustrated example, through a network 320.

In embodiments of the invention, the engine 310 can also be implemented as so-called classifiers (described in more detail below). In one or more embodiments, the features of the engine/classifier (310) described herein can be implemented on the processing system 200 shown in FIG. 2, or can be implemented on a neural network (not shown). In embodiments, the features of the engine/classifier 310 can be implemented by configuring and arranging the processing system 200 to execute machine learning (ML) algorithms. In general, ML algorithms, in effect, extract features from received data (e.g., inputs (sensor data) to the engines 310) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 310 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments, where the engines/classifiers 310 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 300 can be implemented using the processing system 200 applies.

In one or more embodiments, the controller 302 and sensors 314 can be implemented on the processing system 200 found in FIG. 2. Additionally, in embodiments, a cloud computing system can be in wired or wireless electronic communication with one or all of the elements of the system 300. Cloud can supplement, support or replace some or all of the functionality of the elements of the system 300. Additionally, some or all of the functionality of the elements of system 300 can be implemented as a node of a cloud. A cloud computing node is only one example of a suitable cloud computing node and is not intended to suggest any limitation as to the scope of use or functionality of embodiments described herein.

In one or more embodiments, the system 300 manages the operations of an elevator car 304 based on sensor data collected from the sensors 314. The sensors 314 can be affixed to the elevator car 304, disposed within the elevator car 304, affixed to one or more locations outside the elevator car 304, and/or located in an elevator lobby or other predefined areas. The sensors 314 can be any type of sensor for collecting sensor data associated with occupancy detection of elevator passengers. In one or more embodiments, the sensors 314 can be any combination of sensors including, but not limited to, image sensing hardware (e.g., panoramic cameras), weight detection sensors, or Doppler effect sensors. Also, in the illustrated example, only one sensor is present on the elevator car, but any number of sensors can be arranged on or near the elevator cars to monitor the passenger areas for passenger presence.

In one or more embodiments, the passenger occupancy engine 310 can identify the occupancy in the elevator car 304, utilizing machine learning techniques. When an elevator call request is received, the passenger occupancy engine 310 can determine an occupancy level of the dispatched elevator car. An occupancy threshold can be defined either utilizing machine learning or by an elevator technician or building manager. Based on determining the elevator car 304 occupancy level exceeds the occupancy threshold, the system 300 can decline the elevator call request for the occupied elevator car. The system 300 can dispatch a different elevator car if available to fulfil the call request. In one or more embodiments, if the occupancy level for an elevator car 304 is below the occupancy threshold, the system can satisfy the call request with the elevator car 304.

In one or more embodiments, a machine learning model can be trained and tuned by the passenger occupancy engine 310 for determining the occupancy level of the elevator car 304. Data from a weight sensor inside the elevator car 304 or attached to the elevator car 304 can determine a weight increase and associate the weight increase with an occupancy level utilizing supervised/unsupervised learning techniques. A camera can validate the occupancy level developed from the weight sensor data analysis to validate the occupancy level. A feature vector can be created by the machine learning model by extracting features from the sensor data associated with the sensors 314. Features can include weight ranges, weight changes, camera images, changes to camera images over time, and the like. These features can be vectorized and clustering algorithms can be utilized to develop an occupancy level for the elevator car 304, according to one or more embodiments. Deep learning can be utilized for determining elevator passenger occupancy. Deep learning, in depth, can be more efficient to find the occupancy of the car by analyzing images captured by the sensors 314 (e.g., camera) inside of the elevator car 304.

In one or more embodiments, the system 300 can determine an occupancy threshold for operating the elevator car 304. The occupancy threshold can be based on the number of potential passengers that are waiting for the elevator car. For example, if four passengers are waiting in an elevator lobby for an elevator car 304, the occupancy threshold can be set to an expected amount of occupancy needed for the four passengers. The expected amount can be based on a percentage of occupancy needed or any other estimation techniques. The occupancy level of the elevator lobby can be determined by a camera in the lobby area or on any other sensing technology for determining occupancy.

In one or more embodiments, the occupancy threshold can be adjusted based on an expected wait time of a passenger requesting an elevator call. For example, if an occupancy threshold is set at, for example, 80% and a potential passenger would need to wait over a certain amount of time for the next available elevator car, the occupancy threshold can be increased to 85%, for example, to allow for the passenger to board the elevator car 304 to avoid an excessive wait time. This wait time threshold can be set by a building manager, technician, and/or set by a machine learning algorithm.

In one or more embodiments, the occupancy threshold can be set utilizing machine learning techniques. For example, an occupancy threshold that is set too high may have potential passengers that decline to board the elevator car 304 and elect to wait for the next available elevator car. A pattern of this behavior can be detected by the sensors in the elevator lobby and confirmed in the elevator car 304. A machine learning algorithm can determine that the occupancy level can be adjusted to avoid this pattern of behavior. In another example, an elevator lobby sensor may determine that three potential passengers are requesting an elevator car and the occupancy level is set to 75%. If only two potential passengers board and the third potential passenger waits for the next elevator car, the machine learning could adjust the occupancy threshold based on passengers that actually board the elevator car 304 to tune the occupancy threshold to meet passenger comfort levels and/or expectations.

In one or more embodiments, an elevator call request can be made utilizing an input near the elevator car such as an elevator call button. Or the call request can be made utilizing a terminal/panel in an elevator lobby and/or an application on a user device such as a cell phone and app.

Figure 4:
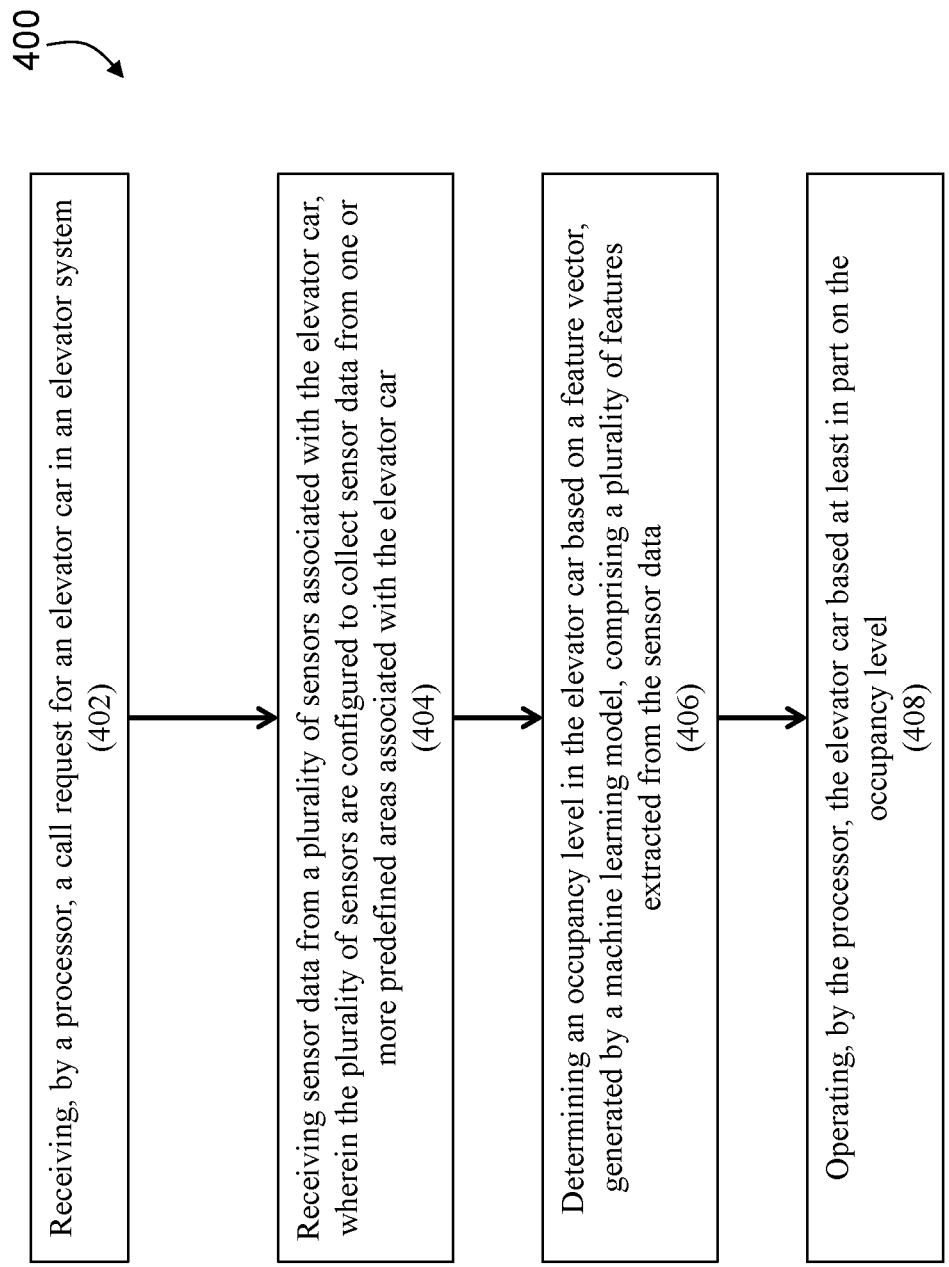
FIG. 4 depicts a flow diagram of a method for managing an elevator system according to one or more embodiments of the disclosure.

FIG. 4 depicts a flow diagram of a method for operating an elevator system according to one or more embodiments. The method 400 includes receiving, by a processor, a call request for an elevator car in an elevator system, as shown in block 402. At block 404, the method 400 includes receiving sensor data from a plurality of sensors associated with the elevator car, wherein the plurality of sensors are configured to collect sensor data from one or more pre-defined areas associated with the elevator car. The method 400, at block 406, includes determining an occupancy level in the elevator car based on a feature vector, generated by a machine learning model, comprising a plurality of features extracted from the sensor data. And at block 408, the method 400 includes operating, by the processor, the elevator car based at least in part on the occupancy level.

Additional processes may also be included. It should be understood that the processes depicted in FIG. 4 represent illustrations and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system comprising:
   an elevator car;
   a plurality of sensors associated with the elevator car, wherein the plurality of sensors are configured to collect sensor data from one or more predefined areas associated with the elevator car; and
   a controller coupled to a memory, the controller configured to:
      receive a call request for the elevator car;
      receive sensor data from the plurality of sensors;
      determine an occupancy level in the elevator car based on a feature vector, generated by a machine learning model, comprising a plurality of features extracted from the sensor data; an
      operate the elevator car based at least in part on the occupancy level in the elevator car (304);
   wherein at least one of the one or more predefined floor areas comprises an area adjacent to an entryway for the elevator car;
   wherein the controller is further configured to analyze, utilizing the machine learning model, the sensor data to determine a lobby occupancy level of an elevator lobby associated with the call request;
      generate an occupancy threshold based at least in part on the lobby occupancy level; and
      based on a determination that the occupancy level in the elevator car is above the occupancy threshold, declining the call request for the elevator car.

2. The elevator system of claim 1, wherein the call request is received from a hall call device receiving a user input.

3. The elevator system of claim 1, wherein the call request is received from a user device.

4. The elevator system of claim 1, wherein the controller is further configured to:
   based on a determination that the occupancy level in the elevator car is below the occupancy threshold, servicing the call request for the elevator car.

5. The elevator system of claim 1, wherein the plurality of sensors comprises at least one of a weight sensor and a camera.

6. A method for operating an elevator system, the method comprising:
   receiving, by a processor, a call request for an elevator car in an elevator system;
   receiving sensor data from a plurality of sensors associated with the elevator car, wherein the plurality of sensors are configured to collect sensor data from one or more predefined areas associated with the elevator car), wherein at least one of the one or more predefined floor areas comprises an area adjacent to an entryway for the elevator car;
   determining an occupancy level in the elevator car based on a feature vector, generated by a machine learning model, comprising a plurality of features extracted from the sensor data; analyzing, utilizing the machine learning model, the sensor data to determine a lobby occupancy level of an elevator lobby associated with the call request; generating an occupancy threshold based at least in part on the lobby occupancy level;
   operating, by the processor, the elevator car based at least in part on the occupancy level in the elevator car, the operating comprising based on a determination that the occupancy level in the elevator car is above the occupancy threshold, declining the call request for the elevator car.

7. The method of claim 6, wherein the call request is received from a hall call device receiving a user input.

8. The method of claim 6, wherein the call request is received from a user device.

9. The method of claim 6, further comprising:
   based on a determination that the occupancy level in the elevator car is below the occupancy threshold, servicing the call request for the elevator car.

10. The method of claim 6, wherein the plurality of sensors comprises at least one of a weight sensor and a camera.

* * * * *